United States Patent
Dobrow

(10) Patent No.: US 12,411,920 B2
(45) Date of Patent: Sep. 9, 2025

(54) DATA INTEGRITY MANAGEMENT IN A COMPUTER NETWORK, INCLUDING SYSTEM THAT ENABLES ROBUST POINT-IN-TIME DIGITAL EVIDENCE GENERATION

(71) Applicant: Asbestos Reports Australia Pty Limited, Queenscliff (AU)

(72) Inventor: Wal Dobrow, Queenscliff (AU)

(73) Assignee: Asbestos Reports Australia Pty Limited, Queenscliff (AU)

( * ) Notice: Subject to any disclaimer, the term of this patent is extended or adjusted under 35 U.S.C. 154(b) by 60 days.

(21) Appl. No.: 18/006,454

(22) PCT Filed: Jul. 20, 2021

(86) PCT No.: PCT/AU2021/050779
§ 371 (c)(1),
(2) Date: Jan. 23, 2023

(87) PCT Pub. No.: WO2022/016214
PCT Pub. Date: Jan. 27, 2022

(65) Prior Publication Data
US 2024/0095321 A1    Mar. 21, 2024

(30) Foreign Application Priority Data

Jul. 21, 2020 (AU) .............................. 2020902523
Nov. 1, 2020 (AU) .............................. 2020103160

(51) Int. Cl.
*G06F 21/32* (2013.01)
*G06F 21/62* (2013.01)
(Continued)

(52) U.S. Cl.
CPC .......... *G06F 21/32* (2013.01); *G06F 21/6218* (2013.01); *G06F 21/64* (2013.01); *H04L 9/50* (2022.05)

(58) Field of Classification Search
CPC .. G06F 21/32; G06F 21/6218; G06F 21/6272; G06F 21/64; G06F 16/587;
(Continued)

(56) References Cited

U.S. PATENT DOCUMENTS

| | | | |
|---|---|---|---|
| 11,122,036 B2* | 9/2021 | Bhatt | .................. H04L 63/0442 |
| 2011/0125656 A1 | 5/2011 | Kingery | |
| 2017/0116560 A1* | 4/2017 | Wickstrom | ............ G06Q 40/03 |
| 2019/0319808 A1 | 10/2019 | Fallah et al. | |
| 2020/0020356 A1 | 1/2020 | Smith et al. | |

(Continued)

FOREIGN PATENT DOCUMENTS

CN    107229853 A1    10/2017

OTHER PUBLICATIONS

International Search Report for International Application No. PCT/AU2021/050779 dated Oct. 15, 2021, 5 pages.
(Continued)

*Primary Examiner* — Theodore C Parsons
(74) *Attorney, Agent, or Firm* — TraskBritt

(57) ABSTRACT

A data integrity management system enables robust point-in-time digital evidence generation. The system enables generation of records representative of point-in-time events involving known persons at known locations. Such systems may be employed in data integrity management processes performed in a computer network.

11 Claims, 8 Drawing Sheets

(51) Int. Cl.
*G06F 21/64* (2013.01)
*H04L 9/00* (2022.01)

(58) Field of Classification Search
CPC ........ G06F 16/787; G06N 20/00; G06N 7/01; H04L 63/123; H04L 9/3231; H04L 9/3239; H04L 9/3297; H04L 9/50; H04L 67/10; H04L 67/104; H04L 67/52; G06Q 10/103; G06Q 30/018; G06Q 30/0225; G06Q 30/0248; G06Q 30/0609; G06Q 50/18; G06Q 50/26; G06V 40/172
See application file for complete search history.

(56) References Cited

U.S. PATENT DOCUMENTS

2020/0043319 A1    2/2020  Nigam et al.
2023/0005608 A1*  1/2023  Blackburn ............. G16H 40/63

OTHER PUBLICATIONS

International Written Opinion for International Application No. PCT/AU2021/050779 dated Oct. 15, 2021, 8 pages.
Uddin et al., A Location Based Time and Attendance System, International Journal of Computer Theory and Engineering, vol. 6, No. 1, (Feb. 2014), pp. 36-38.

* cited by examiner

DATA INTEGRITY MANAGEMENT IN A COMPUTER NETWORK, INCLUDING SYSTEM THAT ENABLES ROBUST POINT-IN-TIME DIGITAL EVIDENCE GENERATION

CROSS-REFERENCE TO RELATED APPLICATIONS

This application is a national phase entry under 35 U.S.C. § 371 of International Patent Application PCT/AU2021/050779, filed Jul. 20, 2021, designating the United States of America and published as International Patent Publication WO 2022/016214 A1 on Jan. 27, 2022, which claims the benefit under Article 8 of the Patent Cooperation Treaty to Australian Patent Application Serial No. 2020103160, filed Nov. 1, 2020 and to Australian Patent Application Serial No. 2020902523, filed Jul. 21, 2020.

TECHNICAL FIELD

The present disclosure relates, in various embodiments, to data integrity management in a computer network. Some embodiments include a system that enables robust point-in-time digital evidence generation. Embodiments of the present disclosure are primarily directed to systems that enable generation of records representative of point-in-time events involving known persons at known locations. While some embodiments will be described herein with particular reference to those applications, it will be appreciated that the present disclosure is not limited to such a field of use, and is applicable in broader contexts.

BACKGROUND

Any discussion of the background art throughout the specification should in no way be considered as an admission that such art is widely known or forms part of common general knowledge in the field.

Smartphones and other mobile devices have become central to modern society. These devices intrinsically allow users to capture point-in-time information, for example, via location tracking applications, metadata tagging of photographs, and the like. However, such intrinsic features fall short of technical requirements to generate secure records of activities and events in an organized manner.

BRIEF SUMMARY

It is an object of the present disclosure to overcome or ameliorate at least one of the disadvantages of the prior art, or to provide a useful alternative.

Example embodiments are described below in the section entitled "claims."

Reference throughout this specification to "one embodiment," "some embodiments" or "an embodiment" means that a particular feature, structure or characteristic described in connection with the embodiment is included in at least one embodiment of the present disclosure. Thus, appearances of the phrases "in one embodiment," "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the present disclosure will now be described, by way of example only, with reference to the accompanying drawings in which.

DETAILED DESCRIPTION

Figure 1:
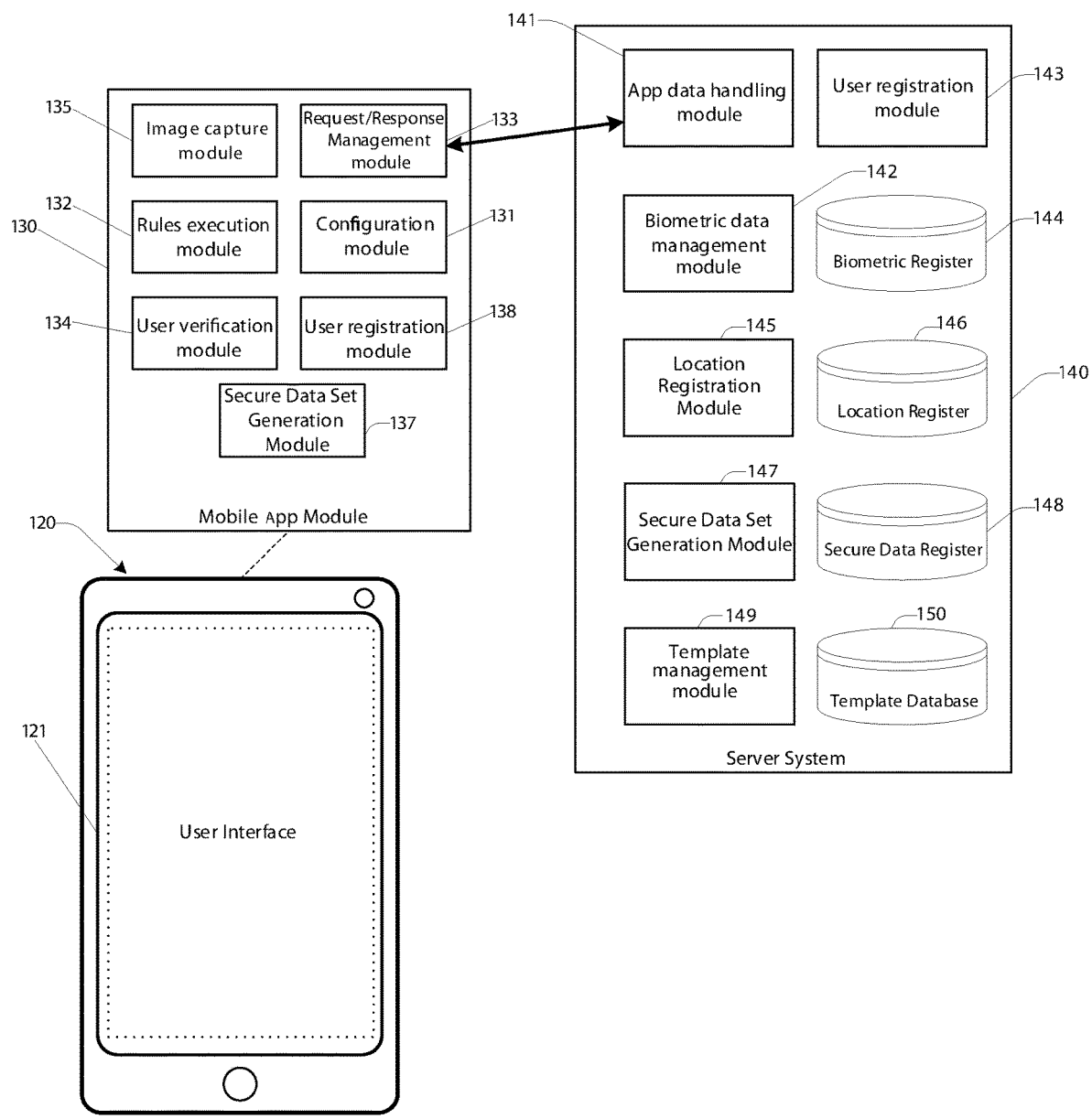
FIG. 1 provides a representation of an implementation of technology described herein according to one embodiment.

The present disclosure relates, in various embodiments, to an integrated system that provides data integrity management functionality. This integrated system enables data integrity management for events recorded via networked mobile devices. Embodiments of the present disclosure are primarily directed to enable generation of records representative of point-in-time events involving known persons at known locations.

Example Data Integrity Management Process

In overview, embodiments described herein provide a streamlined technical process by which users of mobile devices (for example, smartphones) are able to collect point-in-time records of events, and have those stored in a manner that is both robustly secure (i.e., protected from subsequent tampering) and organized (e.g., searchable based on associated metadata). By way of example, this may be used to provide a system that enables robust point-in-time digital evidence generation. For example, such a system may find practical application in contexts including (but not limited to):

Construction and trades. For example, a tradesperson uses the system to collect evidence to verify that a task has been carried out in accordance with defined requirements.

Law enforcement and investigation. For example, an investigator uses the system to collect evidence, for example, including photographic evidence, in a streamlined manner that provides a high level of data integrity.

Delivery of goods and/o services. Delivery is able to be documented in an efficient and effective manner.

It will be appreciated that there are a range of other potential applications. In particular, the technology disclosed herein provides an application agnostic technological framework, which is applicable to numerous real-world settings.

Embodiments are described by reference to a data integrity management system. This system includes an application server, which is configured to communicate with a plurality of discrete networked mobile devices, for example, smartphones executing local software applications via an operating system such as iOS, Windows or Android. For the present purposes, each mobile device executes an event data recordal software application, referred to herein as EDR application for the sake of simplicity. The EDR application is configured to exchange data with the application server. Communications between each instance of the EDR application and the application server are preferably encrypted (for example, via end-to-end encryption methods) for security purposes. The server is able to uniquely identify each executing instance of the EDR application via conventional application server technologies.

It will be appreciated that in some embodiments, various functions directly and/or indirectly associated with the EDR application may be accessed via personal computers (for example, Windows or MacOS machines). This may include performing operations available via the EDR application and/or defining rules/templates for users of the EDR application.

The data integrity management system includes a biometric register in a network accessible location, wherein the biometric register is configured to store electronic records, which associate a plurality of user unique identifiers (UIDs) each with a respective unique associated biometric token. In examples described herein, the biometric token includes a facial biometric token, which is configured to enable verification of a biometric identity based on comparison between data extracted from one or more point-in-time images captured at a mobile device, and the facial biometric token. This allows for verification that a user of the mobile device at a given point in time corresponds to a user described by a given user UID.

The data integrity management system is configured to perform an initial biometric enrolment process, thereby to cause generation of a new user UID and associated biometric token in the biometric register. This includes providing an interface via the application server, which enables a user of a given executing instance of the EDR application to trigger generation of a new record in the biometric register. Triggering generation of a new record in the biometric register includes uploading, via the EDR application, a plurality of data types. These include:

(i) Image data representative of a photo identity document. For example, this may be a government-issued ID such as a drivers' license or passport. In some embodiments, the application server accesses an external networked system (for example, via an API) thereby to perform independent verification of the government-issued ID, for example, using a third party Know Your Customer (KYC) platform.

(ii) Current biometric data including facial image data.

(iii) Other data, for example, including data that classifies one or more purposes for which the user will be using the EDR application, copies of qualifications/certifications and the like, and other forms of data that are relevant to a particular implementation environment. It will be appreciated that the technology described herein may be implemented across a range of use cases to assist in practical situations, but that the present specification is concerned with technical components and processes rather than practical details of real-world implementations.

Alternate method for performing biometric enrolment may also be used, for example, leveraging third party platforms.

The process of generating a new record in the biometric register includes generating a new user UID and associating that new user UID with a biometric token derived from the current biometric data. In a preferred embodiment, the process of generating a new record in the biometric register additionally includes (i) performing a first facial recognition process thereby to verify that the photo identity document includes a photo that matches the current biometric data including facial image data; and (ii) in the case that verification at (i) is successful, defining a facial biometric token based on the current biometric data including facial image data. This provides technical advantages in the sense that there is a one-off biometric verification of the user against their photo ID, and subsequently enhanced biometric verification based on a biometric token generated from facial image capture. For example, it will be appreciated that facial comparison to an uploaded government ID is less reliable than other facial biometric techniques available via modern smartphones. In some implementations, face recognition processing can use one or more of the following face recognition/verification processes: Principal Component Analysis using eigenfaces, Linear Discriminate Analysis, Elastic Bunch Graph Matching using the Fisherface algorithm, the Hidden Markov model and neuronal motivated dynamic link matching. In some implementations, face recognition/verification techniques (e.g., supervised learning, Viola-Johns face detection) can be used in a manner that adheres to the LFW (Labelled Faces in the Wild) benchmark.

In further embodiments, additional and/or alternate biometric techniques may be used for the purposes of enrolment and/or verification, including iris scanning, fingerprints and the like. Preferably a process is performed thereby to ensure that biometric information collected indeed matches a user who is verified via ID. This may in some cases include the use of third party pre-authenticated biometric databases. Facial biometric is used herein as a primary example for the purposes of description of embodiments.

The system additionally includes a location register in a network accessible location, wherein the location register is configured to store electronic records that associate a plurality of location UIDs each with a respective geolocational token. In a preferred embodiment, these records correlate a physical street address to a geolocational token defined based on a range of two-dimensional or three-dimensional coordinates (for example, using GPS-based geofencing, optionally in combination with height/altitude data inferred from other mobile device sensor components). The application server provides an interface that enables a user of a given executing instance of the EDR application to associate one or more location UIDs with a selected user UID. This association is used for the purposes of locational categorization of recorded events. For example, event data recording is performable only in respect of locations with which a given user's UID is pre-associated. This association may be triggered by the user, or by a third party with direct or indirect knowledge of the user's UID.

A key function of the data integrity management system is the generation of secured data sets. These secured data sets are generated by a user thereby to maintain a permanent verified record of a real-world event at a point-in-time. In overview, each secured data set contains at least the following data artefacts:

Biometric data that confirms a current user identity. This may include raw and/or extracted data used for the purposes of facial biometric identification at a point-in-time associated with the secured data set.

Location data based on a location of a mobile device that is used to generate the secured data set, at the time the data set is defined.

Image data for one or more images captured via the mobile device. These preferably include associated metadata, which is used to verify a time of capture and location of capture (this may include locational metadata, including longitude/latitude and altitude). It will be appreciated that "image data" may include photos and/or videos.

Other data may be included, for example, alphanumeric labels for the data set as a whole and/or for individual images within the data set.

The data integrity management system includes an interface, which is provided via the application server, this interface enabling a user of a given executing instance of the EDR application to trigger defining of a secured data set. Triggering defining of a secured data set includes, within a predefined time period:

(i) Performing a biometric verification process based on point-in-time biometric data collection via the EDR application, thereby to verify a UID based on its associated unique biometric token.

(ii) Determining current positional data for a device on which the EDR application is executing, and correlating that current positional data for a geolocational token for a location UID associated with the UID.

(iii) Uploading one or more image files for images captured via the device on which the EDR application is executing either during the predefined time period or during a threshold window preceding the predefined time period.

In the case that predefined data integrity requirements are satisfied, the system is configured to perform a storage operation for the secured data set, including storage in a network accessible database. These data integrity requirements optionally include, by way of example: successful biometric verification; successful correlation between current positional data for a geolocational token for a location UID associated with the UID; successful verification that each image file was captured at a required time and location; and verification that image capture, biometric verification and data input all occur within a defined time window. Further requirements may be present in further embodiments.

The data integrity management system operates to apply a data integrity preservation measure thereby to inhibit modification of the secured data set. This preservation varies between embodiments, and several examples are discussed herein. These include applying database management techniques, which record timestamped details of all changes to records.

In a preferred embodiment, a blockchain type process is used as part of applying the data integrity preservation measure thereby to inhibit modification of the secured data set. For example, this may include executing a predefined algorithm thereby to define a data integrity token for the secured data set, and adding the data integrity token to a blockchain. The predefined algorithm is defined such that, in the event that the secured data set is modified, the predefined algorithm generates a distinct data integrity token (for example, data hashing algorithms may be used, as discussed in more detail further below). In this manner, such that a blockchain provides an immutable record for verifying data integrity of the secured data set.

In some embodiments, multiple blockchains are used, for example, a separate blockchain for each location UID. This assists in reducing the number of transactions in each blockchain. Configuring separate blockchains based on location is in some cases preferable given that it assists in organizing records relating to a common location.

Example Technological Framework

FIG. 1 illustrates a technology framework according to one embodiment. It should be appreciated that, although the framework of FIG. 1 utilizes elements of known hardware, software, communication techniques and processing techniques, the manner by which these and other elements are combined allows the delivery of improved data integrity management processes, which deliver technical improvements over conventional/intrinsic smartphone technology. That is, the combination of the hardware and the software, together with the results of operating the system, produce new and previously unknown outcomes. These new and previously unknown outcomes deliver technical advantages in the field of data security and integrity management. These outcomes find useful application across a wide range of commercial fields. However, application of the technology to business environments is generally ignored for the purposes of this specification, as the technological contribution lies in the technical field of data integrity management as opposed to business-specific use cases of that contribution.

In the context of the example of FIG. 1, the EDR application is a mobile software application (i.e., a collection of computer executable code stored on a memory device) is executed via one or more processors of a mobile device (for example, a smartphone or tablet device having a camera module). The mobile device may be, for example, a device with an Android or iOS type operating system. The mobile device is connected to a network (for example, a Wi-Fi network or cellular telecommunications network), which allows the mobile software application to communicate with a server device that is configured to perform cloud-based processing steps to support the operation of the mobile application. It will be appreciated that various steps described herein may be shifted between local and cloud-based processing in further embodiments.

Software executing at the mobile device and server system is described by reference to a plurality or "modules." The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out." The statement becomes meaningless if the determination as to whether something is A is not performed.

The term "system" refers to an arrangement where multiple computers, hardware configurations, and devices are interconnected via a communication network (including a one-to-one communication connection). The term "system," and the term "device," also refer to an arrangement that includes a single computer, a hardware configuration, and a device. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a ledger within a CPU (Central Processing Unit).

In the example of FIG. 1, a mobile device 120 communicates with a server system 140 (which includes the application server) via an Internet connection, by way of a request/response management module 133, which provides request data for transmission to server system 140, where it is received and processed by an app data handling module 141. Module 141 is configured to receive and handle requests from a plurality of separate mobile devices such as device 120, which each execute the same or similar versions of module 130. Module 141 provides responses to the relevant mobile devices based on processing of the requests. In some cases module 141 transmits data to a specified mobile device, such as device 120, without a preceding request from that device (i.e., processes executing at the server are configured to initiate push requests based on predefined triggering conditions defined in computer executable code).

Device 120 is configured to render on its display screen 121 a mobile device user interface for the EDR application. The user interface is rendered and controlled based on software illustrated as an EDR mobile app module 130. Module 130 executes based on standalone code stored on device 120. In a further embodiment, a web-app may be used, which executes based on code downloaded from a server for rendering in via local web browser.

Module 130 configures mobile device 120 to cause rendering of the EDR application user interface at the mobile device. Various processes performed via the EDR interface are discussed in more detail further below.

A client side user registration module 138 is configured to interact with a server side user registration module 143 thereby to enables a user of a given executing instance of the EDR application to trigger generation of a new record in biometric register 144. Biometric register 144 is provided in a network accessible location, and is configured to store electronic records that associate a plurality of user unique identifiers (UIDs) each with a respective unique associated biometric token.

Module 138 is configured to perform a process including obtaining and uploading via the EDR application:
  (i) Image data representative of a photo identity document; This may be extracted from a photo captured, for instance, via in image capture module 135, or a stored image file (for example, a screenshot). A facial image and one or more attributes of alphanumeric data may be extracted from the image data. The alphanumeric data is preferably used to populate additional field values in the new biometric user record (for example, ID number, name, date of birth, etc.) via known ID data extraction techniques. This may be verified against external databases (for example, via a KYC platform API) thereby to verify identity against pre-existing registers.
  (ii) Current biometric data including facial image data. This may include capturing one or more image files and/or other data via camera units provided on the device.

The process of generating a new record in the biometric register includes generating a new user UID and associating that new user UID with a biometric token derived from the current biometric data via a biometric data management module 142. Processing steps may be split between modules 138 and 143. An example method is provided further below.

A configuration module 131 allows a user to customize/configure aspects of operation of the EDR application. This may include managing association with locations, and selection of rules templates. In relation to the former, a location register 146 is configured to store electronic records that associate a plurality of location UIDs each with a respective geolocational token (for example, a geographical token based on GPS coordinate ranges). Configuration module enables a user one or more location UIDs with their user UID. This allows a user to preconfigure locations at which events are anticipated to occur (for example, a home location, office location, one or more worksite locations, and so on).

The server system provides a secure data set generation module, which operated in conjunction with a client side secure data set generation module thereby to enable a user of the EDR application to cause defining of a secured data set, which upon completion is stored in a secure data register 148. Example methods for defining a secured data set are discussed further below.

Server system 140 additionally provides a template management module 149 in conjunction with a template database 150. Template management module allows for the generation of templates that enable customization of a secure data set generation process thereby to prompt a user to upload specific images and/or additional data. This allows for standardization of data collection practices for specific practical situations. For example, in a quality assurance setting relating to an object, the template may prompt the user to capture images of the object from a series of defined angles. Templates may additionally define rules for triggering of data collection, for example, based on location, input from an external system, or other means. In some embodiments, templates are executed at the EDR application based on selection of templates by a user and a rules execution module 132, which is configured to download a template and execute associated rules. Selection of a template may occur following commencement of secured data set generation (for example, a user selects a "freeform" data set, or a template-customized data set), or prior to commencement of secured data set generation (such as a template that automates triggering is selected via configuration module 131, optionally being a template that prompts generation of a template-customized data set on a specific time schedule).

In some embodiments, the template management module enables a plurality of users to define new templates, and make those templates available to other users. This enables operation of the system to be customizable for particular practical situations, thereby to standardize data set creation and content. For example, in one example, a template is defined to facilitate generation of a data set that records, in a standardized manner, compliance with industry best practice and/or regulations for a given real-world operation.

In some embodiments, a template or a set of templates may have restricted access, optionally via a paywalls, subscription level requirement, or the like. This allows for monetization of particular templates and/or sets of templates.

By way of example, in some embodiments, a template is configured to enable capturing of evidence to confirm that a task, for example, a construction industry task such as waterproofing of a bathroom, is performed in accordance with predefined best practice guidelines. In this manner, the template includes instructions prompting for image (or other data) capture during performance of a task, thereby to provide a robust digital record confirming that the task has been performed in accordance with predefined best practice guidelines.

Example Process Flow

Figure 2:
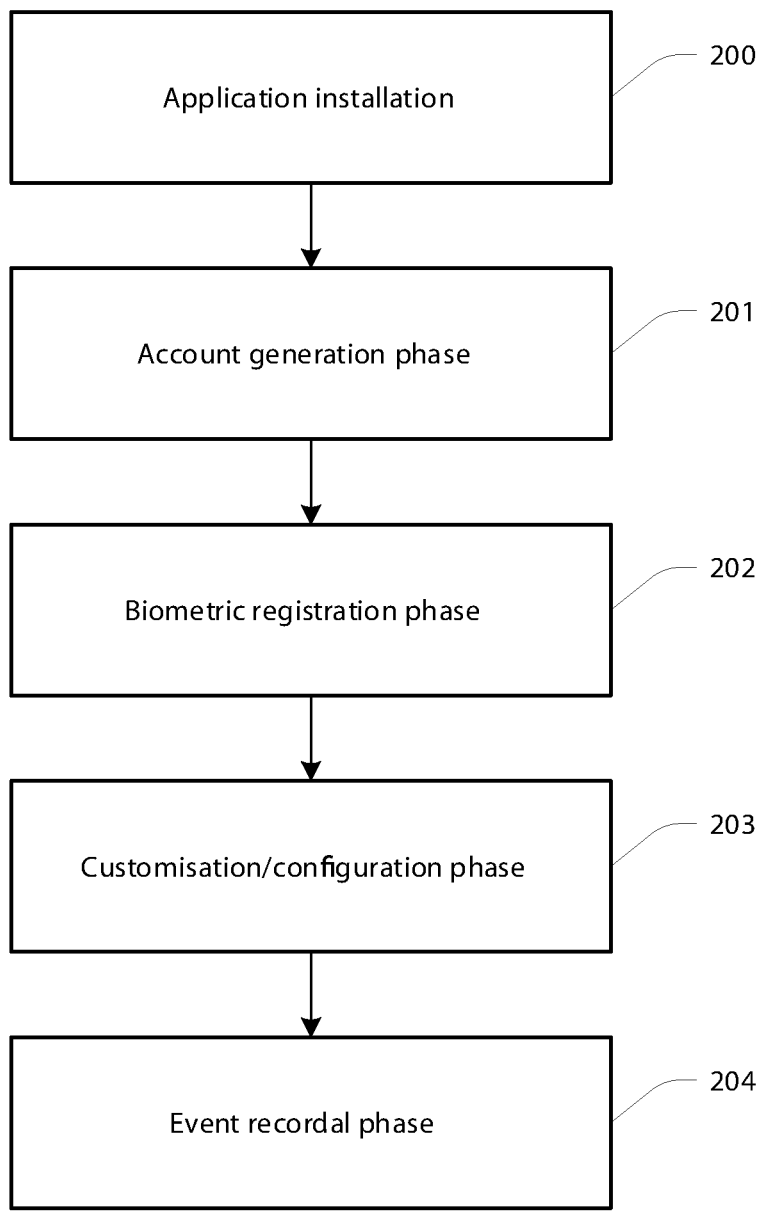
FIG. 2 illustrates a method according to one embodiment.

FIG. 2 illustrates an example process flow related to operation of the EDR application. Block 200 represents an application installation phase, whereby data defining the EDR application is downloaded from an online source to the mobile device, and installed. The EDR application is then able to be executed, and perform an account generation phase (block 201). This preferably includes inputting and uploading information, for example, in alphanumeric format and/or via upload of images/files from which data is extracted (for example, via OCR processes). Assuming inputted information satisfies verification requirements (for example, as cross-checked against via a KYC process), a new record is generated based on a new user UID.

Figure 3A:
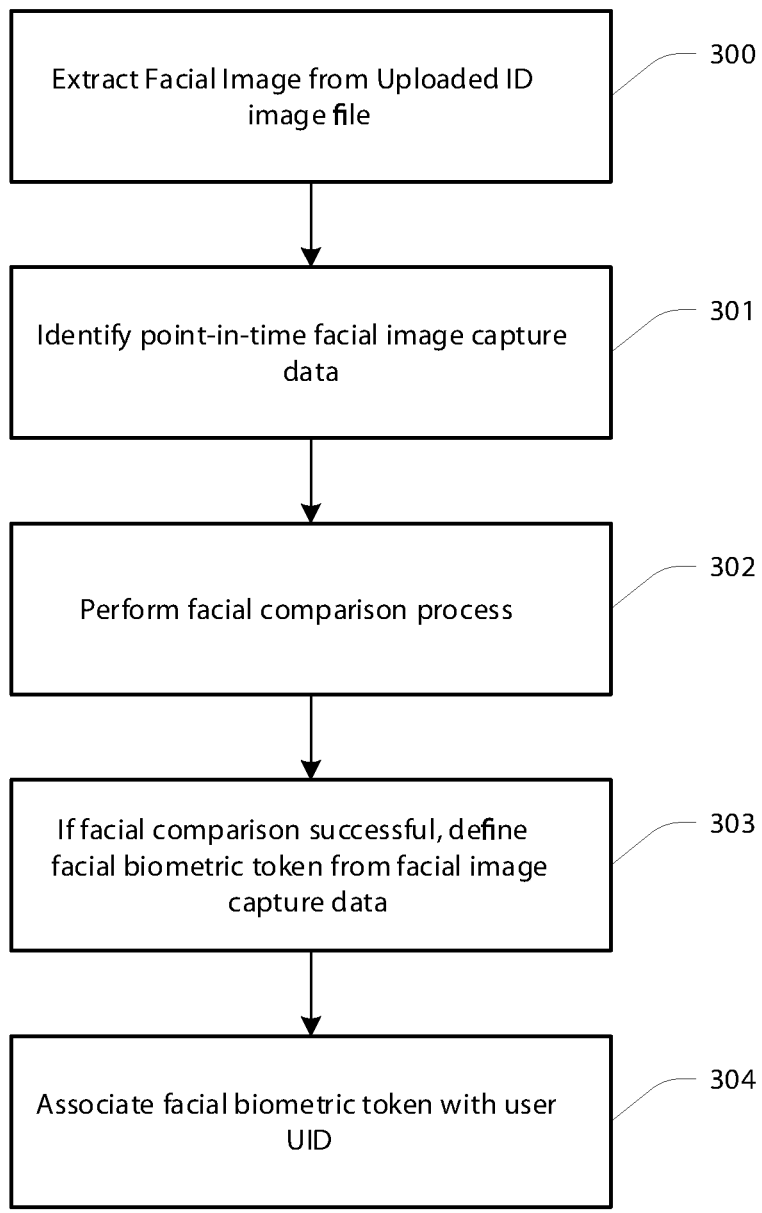
FIG. 3A illustrates a method according to one embodiment.

The new record is then modified subject to a biometric registration phase (block 202). An example biometric registration phase is illustrated in FIG. 3A. Block 300 represents a process including extracting a facial image from an uploaded image file containing a government issued ID. This is optionally performed via a trained AI image classifier module trained to identify and process ID documents, with such modules known in the art. Alternately, template-based artefact extraction may be used. This results in the defining of an image containing facial data. Block 301 represents a process including identifying point-in-time facial image data, for example, captured via the EDR application. This is optionally verified using time stamps and/or geolocation matching via image metadata. In some embodiments, a technical security measure is applied to ensure that the capture is a live facial capture and not a capture of a still image. At block 302, a facial comparison process is performed between the facial data of block 300 and the facial data of block 301. In some implementations, this face recognition processing can use one or more of the following face recognition/verification processes: Principal Component Analysis using eigenfaces, Linear Discriminate Analysis, Elastic Bunch Graph Matching using the Fisherface algorithm, the Hidden Markov model and neuronal motivated dynamic link matching. In some implementations, face recognition/verification techniques (e.g., supervised learning, Viola-Johns face detection) can be used in a manner that adheres to the LFW (Labelled Faces in the Wild) benchmark. In the case that matching is successful, a facial biometric token is generated for the user at block 303 via data from the process of block 301 (optionally multiple frame captures are used at that stage, depending on a facial token generation method). That token is associated with the user UID in the biometric register at block 304.

In some embodiments, a secured data set representative of the facial comparison process at block 302 is defined thereby to enable subsequent auditing of this phase of identity verification. This is optionally subjected to a hashing and/or blockchain recordal process as described further below in relation to other forms of secured data sets considered herein.

Block 203 represents a customization/configuration phase, whereby a user configures custom settings for the EDR application. These may include, by way of example:
  Associating with location UIDs.
  Setting rules for each location UID, for example, configuring triggering of a biometrically-verified check-in event each time the mobile device arrives at a defined location.
  Selecting one or more templates that are to be accessible via the EDR application. This may include selecting a set of templates that are most relevant to a user's intentions with the application, and/or purchasing templates (e.g., making a purchase that allows a user access to use a given template) from an online store.

Block 204 represents an event recordal phase, whereby a user engages in interactions with the EDR application thereby to trigger generation of secured data sets that comprise a combination of biometric, location and image capture and verification. This is discussed in more detail below.

Figure 3B:
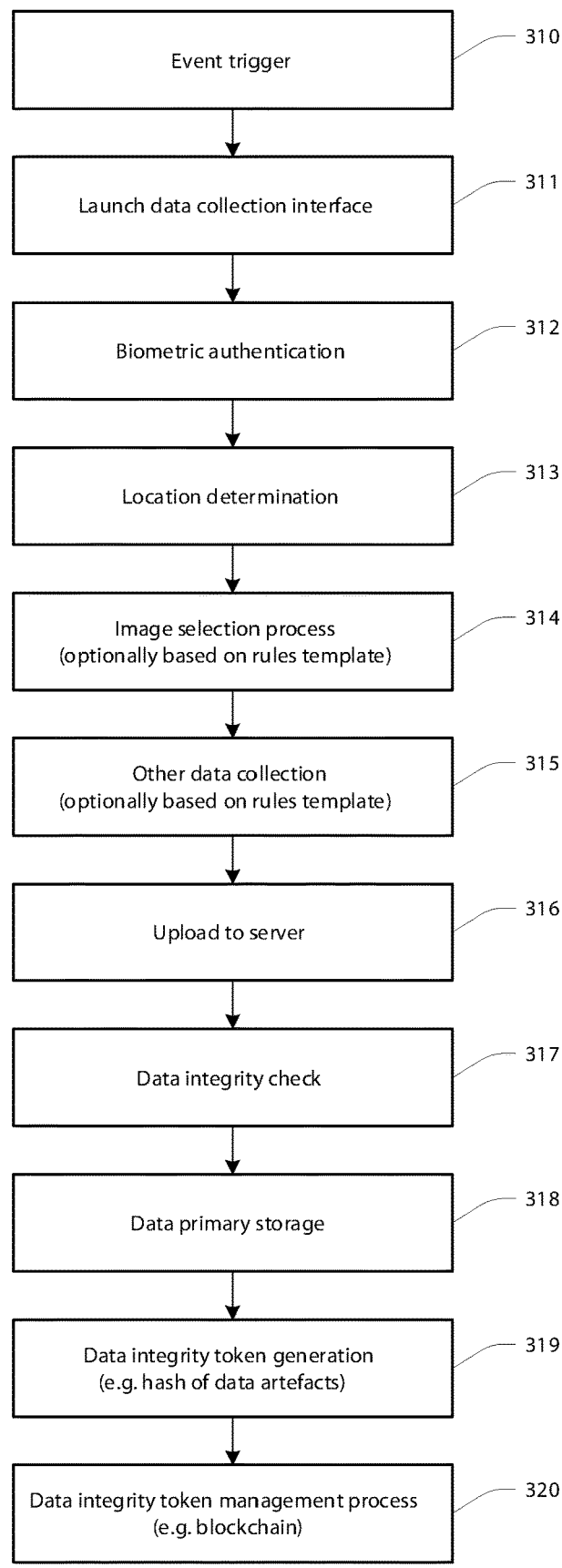
FIG. 3B illustrates a method according to one embodiment.

There may be additional phases, for example, a data access phase, whereby one or more users are able to search and/or access secured data sets (in some cases requiring access permissions). In some embodiments, a first user is able to share access to data from a secured data set with one or more other users (being EDR application users or users with web-browser applications) via a hyperlink or the like.
Example Secure Data Set Generation Process FIG. 3B illustrates an example process for causing generation of a secure data set to be maintained in register 148. This may involve a standard (or "freeform") secure data set generation process, by which a user exercises control over image and other data that is collected, or a template-customized secure data set generation process, where a predefined template causes delivery of a set of prompts for a user to collect defined image data and optionally input values for defined information types.

The process commences with an event trigger (block 310). Examples of event triggers include the following:

A manual event trigger, where a user manually triggers the secure data set generation process. For example, this is used where a user has identified a real-world situation that warrants evidentiary recordal.

A location-based trigger, for example, based on geolocational monitoring. Such a trigger is in some cases executed in the case that a device associated with a given user UID enters a geographic zone described by a location token for a location UID associated with that user UID. It will be appreciated that such an approach is useful for the purposes of generating a biometrically verified record of arrival at a specified location. Location triggers are in some cases also tied to location beacons, for example, BLE beacons, which are configured to trigger template-customized secure data set generation at their respective locations.

A time-based trigger, which causes an event trigger at a defined date/time. For example, time-based trigger may be tied to a specific template-customized secure data set generation process.

Following triggering, a data collection user interface process is launched via the EDR application (see block 311), this process including a series of activity prompts each requiring input from the user. The series of prompts may be based on a "freeform" standard, or a selected template. In some cases the user makes a selection of the "freeform" standard, or selects a template at the process of block 311 (for example, the user utilizes a search function or a drop down menu to identify a template for a category of event that is to be recorded). In cases where template rules provide the trigger event at 310, a template is preselected.

Block 312 represents a biometric authentication process. In the present embodiment, this is a facial biometric verification process, whereby an image capture module of the device on which the EDR application is executing is called to capture image data and perform a biometric verification process based on a biometric token associated with user UID for that device (the verification may be performed at the client or server side depending on implementation). In the event of successful biometric verification, data representative of that verification is defined for inclusion in the secured data set. The data representative of that verification is preferably selected to include data that enables subsequent validation of the biometric verification technique (e.g., to enable hindsight auditing to ensure that process was performed correctly). This data may include one or more of the following:

Image data used for facial biometric processing.
Results data for verification process (optionally including data representative of inputs).
Data representative of biometric token from biometric register that was used for verification.

Block 313 represents location determination/authentication. This may be performed based on GPS and/or other mobile device locating technologies (e.g., Wi-Fi/network triangulation, BLE beacon proximity, and the like). In some embodiments, a process is performed thereby to cause a device check-in when the device arrives at a known location, and perform an altitude reading (e.g., barometric-based), thereby to enable subsequent comparative altitude readings during a subsequent time period, and hence allow identification of device location at different floors in a building. It will be appreciated that verification of location in three dimensions is important for some applications of this technology. It will be appreciated that the process of block 313 need not be performed sequentially following block 312.

Block 314 represents a process including image selection. In some embodiments, image selection includes enabling selection of pre-captured images in device memory, which are preferably verified via image metadata thereby to ensure they were captured within predefined proximity and a threshold time period of the process of block 314 (this verification may occur as a client or server side process). However, in a preferred embodiment, image capture is point-in-time via a software module, which leverages a camera unit on the mobile device and triggers a capture command.

In the case that the image selection process is based on a "freeform" standard, a user is prompted to capture an image, and selectively input an image description (i.e., one or more items of alphanumeric information), and optionally repeat that process for further images. It will be appreciated that this allows a user to capture one or more images, and denote significance in those images, and have those stored in a secure manner with verification of biometric identity and location.

In the case that the image selection process is based on a template, a user is prompted to capture an image based on a predefined image description, and depending on the template additionally prompted to input one or more items of alphanumeric information. For example, the user may be prompted to "capture item X from angle Y at a distance of Z meters," and "input current data value A." In some cases additional sensors (for example, via networked devices or via the mobile device itself) are used to capture additional inputs for association with that image. The process then progresses to a next prompt defined for the template, with such a progression continuing until the template's capture process is completed. In this manner, by way of example, templates may be created to comply with industry best practice for evidence collection, for example, in the context of quality assurance and/or risk management, and these result in generation of a secured data set including photographic evidence, which is stored in a secure manner with verification of biometric identity and location.

Block 315 represents collection of other data artefacts, which are not associated with images. These may include data artefacts from sensors on the mobile device (e.g., via microphones, light sensors, IMUs and the like), and/or data retrieved from networked locations (for example, a networked temperature sensor, a value made available via a web service, and so on). Protocols for collection of such data are preferably encoded into a template such that this stage is automated based on that template. It will be appreciated that the process of block 315 is optional, and in some embodiments, only performed where template is encoded to trigger collection of such data.

Block 316 represents a process of uploading data to the application server, followed by a data integrity check at block 317. It will be appreciated that these steps may be performed repeatedly in conjunction with preceding data collection processes, rather than as a batched event. The data integrity check process checks, for each element of data that is to be stored in a secured data set, that data is checked to ensure that certain requirements are met. This may include verification of time stamps for input and/or data transmission, verification of image metadata, and the like. The process may include an algorithm that defines a set of data attributes to check, and a required data value or value range for each attribute, all of which must be met before verification is successful. A message is communicated to the EDR application in the case of successful verification, optionally including a compiled representation of a verified secured data set for final user approval (preferably with such approval requiring biometric verification).

In the case that verification is unsuccessful, the user may be prompted to try again. In some embodiments, a recordal of an unverifiable data set is made in the same manner as a verified data set, thereby to preserve a record of any attempts to upload incorrect/fraudulent data.

Block 318 represents a process including storage of the verified/approved secured data set. The data set is recorded in a network accessible location (e.g., register 148) and optionally at one or more other devices (for example, at the mobile device). It will be appreciated that having multiple identical copies of the secured data set is of assistance for data integrity in view of additional measures discussed below. The storage is preferably performed in a manner that allows searching based on various data attributes. In particular, this allows for sorting/filtering of secured data sets by user UID and location UID.

Block 319 represents a data integrity token generation process. This preferably includes executing a predefined algorithm that converts the secured data set into a unique token, for example, an alphanumeric token. This may be achieved, for example, by applying cryptographic hash function (e.g., SHA-1) to elements to the secured data set, either in totality or isolation. In one embodiment, image hash functions are applied to individual images, and other hash functions are applied to alphanumeric data, and the results combined into a token. It will be appreciated that various techniques may be applied, with a common outcome that: (i) applying the algorithm to the secured data set will always produce the same data integrity token; and (ii) in the event that the secured data set is modified in any way, applying the algorithm to the modified secured data set will produce a distinct data integrity token. In some embodiments, the algorithm is executed at both the mobile device and the server device on their respective copies of the secured data set, thereby to verify that the data set being stored centrally matches a data set approved by a user locally.

Block 320 represents a data integrity token management process, whereby the data integrity token is stored securely thereby to enable later verification that a secured data set has not been modified. In a preferred embodiment, the data integrity token is added to a blockchain, along with other data that allows for correlation of the data integrity token to the secured data set (for example, a data set UID, which may be generated based on data such as user UID, location UID, and/or a time stamp). In some cases both a server-side generated data integrity token and a device-side generated data integrity token are added to the blockchain, thereby to provide added verification that the secured data set approved by a biometrically verified user matches the secured data set initially stored by the server.

Figure 4:
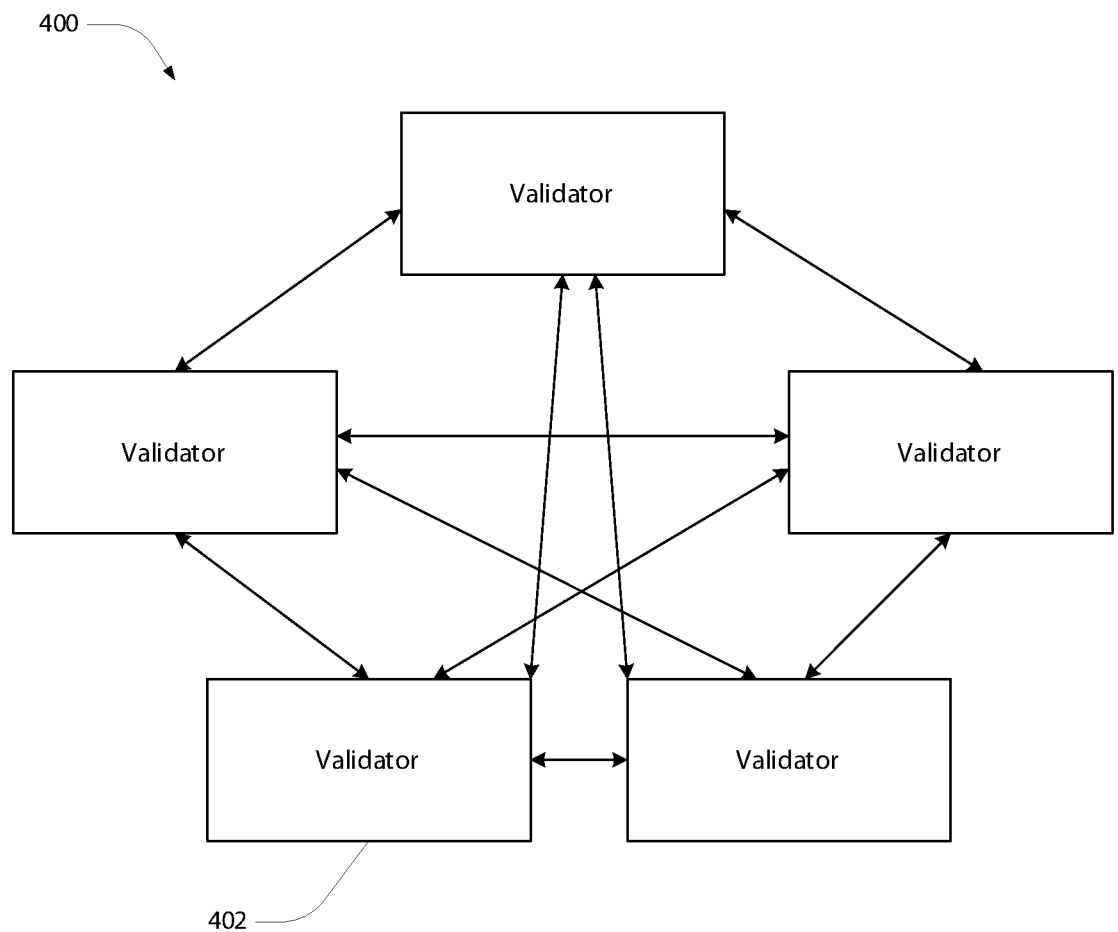
FIG. 4 illustrates a method according to one embodiment.

With reference now to FIG. 4, any transactions submitted to the blockchain are validated by a set of validator nodes 400 of the blockchain. Each validator node 402 performs a series of mathematical computations to determine whether a blockchain transaction is valid and also determines whether the transaction complies with the rules of the blockchain. A consensus of the set of validator nodes 400 is required to add a transaction to a block for appending to the blockchain.

Figure 5:
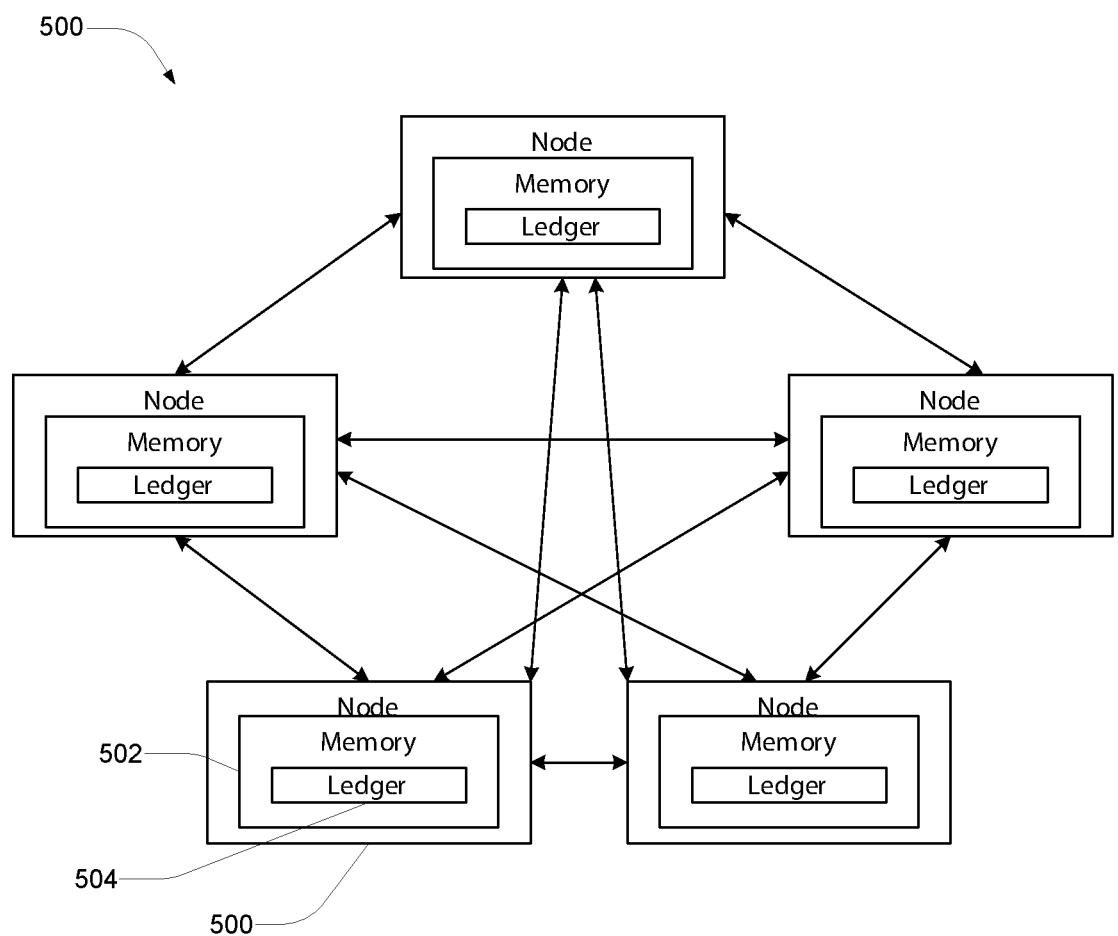
FIG. 5 illustrates a method according to one embodiment.

With reference now to FIG. 5, in some aspects, the blockchain is stored in a decentralized manner on a plurality of nodes 500. Nodes 500 may each include memory 502 that stores at least a portion of the ledger 504 of the blockchain. In some aspects, every node 500 may store the entire ledger 504. In some aspects, each node 500 may store a portion of ledger 504. In some aspects, some or all of nodes 500 may be also be validator nodes 400. In some aspects, some or all of the blockchain may be stored in a centralized manner.

Overview of Utility

It will be appreciated that the above disclosure provides for improved data integrity management, which may be applied in a wide variety of practical situations. Example practical use cases may include:

Collection of evidence, including photographic evidence, for use in legal proceedings or the like.

Collection of evidence, including photographic evidence, thereby to demonstrate compliance (for example, compliance with regulations, protocols, industry best practice, and so on).

Collection of evidence, including photographic evidence, in the context of supply chain management (for example, in relation to confirming/disputing receipt of goods at a given time and location).

Worksite management, for example, in the construction space, for the purposes of quality assurance auditing.

Consumer interaction automation, for example, in the context of rental car returns (e.g., a template is defined with instructions for a rental car user to perform a car return process with photographic uploads).

This is intended to provide a sampling of use cases only. As noted above, the present disclosure is directed to an integrated secure data management system. This system results in improved data management through the improved use of computer technologies.

Example Device Architecture

Figure 6:
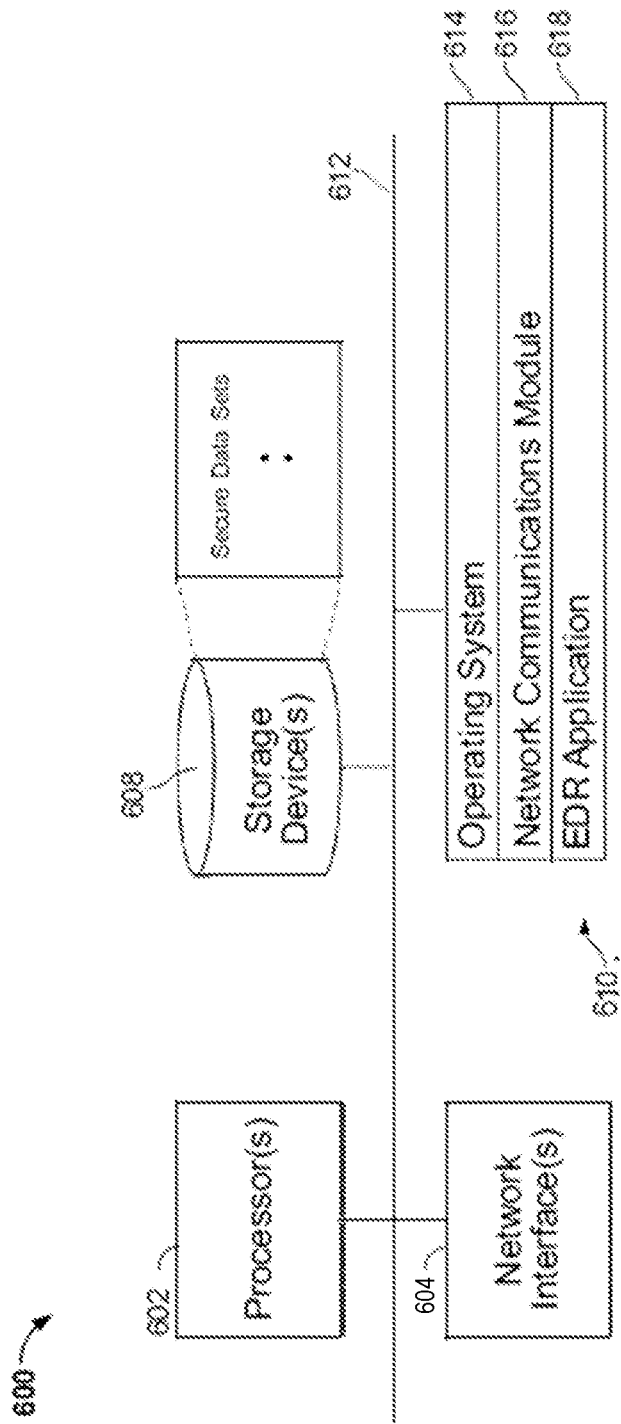
FIG. 6 is a block diagram of an exemplary architecture for a network service.
Figure 7:
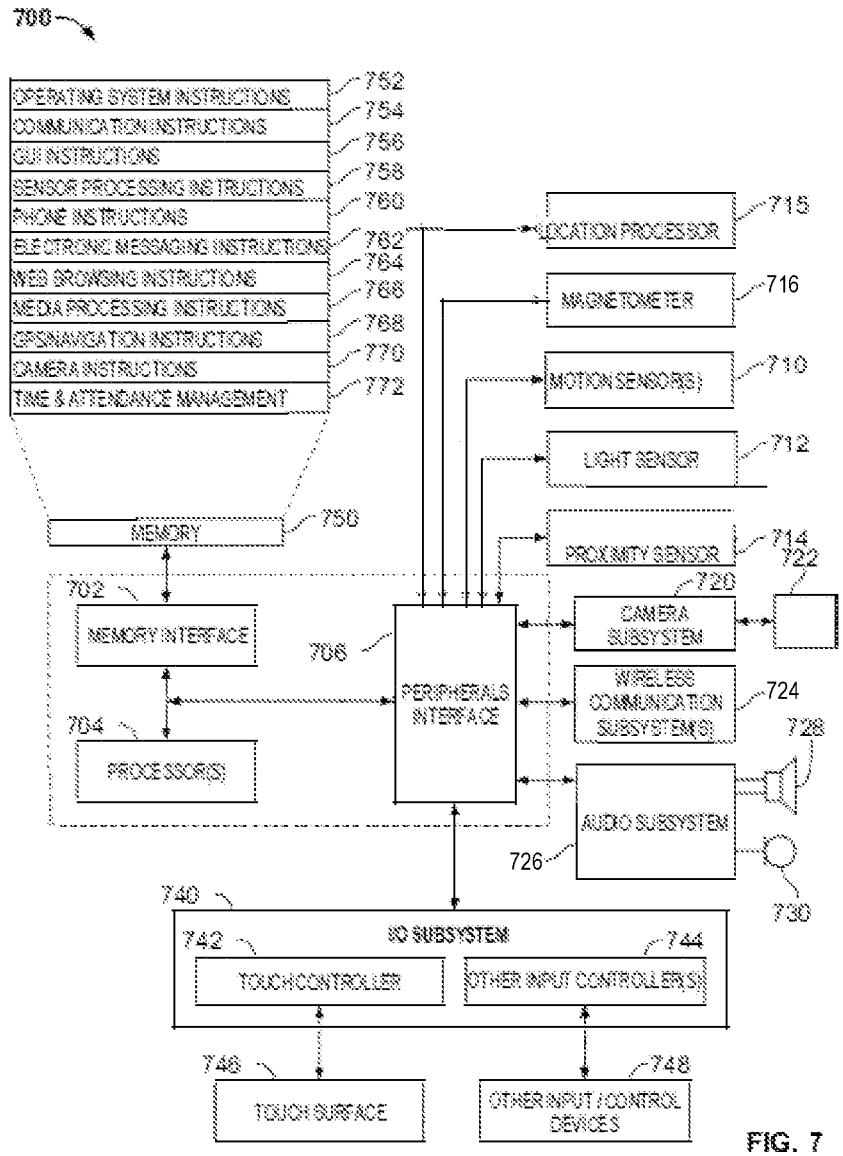
FIG. 7 is a block diagram of an exemplary architecture for a mobile device.

FIG. 7 is a block diagram of an exemplary architecture for a mobile device capable of executing the EDR application. Architecture 700 can be implemented in any device for generating the features described in reference to FIGS. 1-11, including but not limited to portable or desktop computers, smart phones and electronic tablets, television systems, game consoles, kiosks and the like. Architecture 700 can include memory interface 702, data processor(s), image processor(s) or central processing unit(s) 704, and peripherals interface 706. Memory interface 702, processor(s) 704 or peripherals interface 706 can be separate components or can be integrated in one or more integrated circuits. The various components can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the device. For example, in some implementations, light sensor 712 can be utilized to facilitate adjusting the brightness of touch surface 746. In some implementations, motion sensor 710 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 706, such as a temperature sensor, a biometric sensor, or other sensing device, to facilitate related functionalities.

Location processor 715 (e.g., GPS receiver) can be connected to peripherals interface 706 to provide geo-positioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 724. Communication subsystem(s) 724 can include one or more wireless communication subsystems. Wireless communication subsystems 724 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 724 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 724 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 726 can be coupled to a speaker 728 and one or more microphones 730 to facilitate voice-enabled functions, such as voice recognition, voice replication, digital recording, and telephony functions.

I/O subsystem 740 can include touch controller 742 and/or other input controller(s) 744. Touch controller 742 can be coupled to a touch surface 746. Touch surface 746 and touch controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 can display virtual or soft buttons and a virtual keyboard, which can be used as an input/output device by the user.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In some implementations, device 700 can present recorded audio and/or video files, such as MP3, AAC, and MPEG files. In some implementations, device 700 can include the functionality of an MP3 player and may include a pin connector for tethering to other devices. Other input/output and control devices can be used.

Memory interface 702 can be coupled to memory 750. Memory 750 can include high-speed random access memory or non-volatile memory, such as one or more magnetic disk storage devices, one or more optical storage devices, or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers or servers. Communication instructions 754 can also be used to select an operational mode or communication medium for use by the device, based on a geographic location (obtained by the GPS/Navigation instructions 768) of the device. Memory 750 may include graphical user interface instructions 756 to facilitate graphic user interface processing, such as generating the GUIs shown in FIGS. 1-11; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions and display GUIs described in reference to FIGS. 1-11; media processing instructions 766 to facilitate media processing-related processes and functions; GPS/Navigation instructions 768 to facilitate GPS and navigation-related processes; camera instructions 770 to facilitate camera-related processes and functions; and instructions 772 for a time and attendance management application that is capable of displaying GUIs, as described in reference to FIGS. 1-11. The memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Example Network Service Architecture

FIG. 6 is a block diagram of an exemplary architecture 600 for a network service capable of providing network-enabled time and attendance management services. In some implementations, architecture 600 can include processors or processing cores 602 (e.g., dual-core Intel® Xeon® Processors), network interface(s) 604 (e.g., network interface cards), storage device 608 and memory 610. Each of these components can be coupled to one or more buses 612, which can utilize various hardware and software for facilitating the transfer of data and control signals between components.

Memory 610 can include operating system 614, network communications module 616 and time and attendance management application 618. Operating system 614 can be multi-user, multiprocessing, multitasking, multithreading, real time, etc. Operating system 614 can perform basic tasks, including but not limited to: recognizing input from and providing output to client devices; keeping track and managing files and directories on computer-readable mediums (e.g., memory 610 or storage device 608); controlling peripheral devices; and managing traffic on the one or more buses 612. Network communications module 616 can include various components for establishing and maintaining network connections with client devices (e.g., software for implementing communication protocols, such as TCP/IP, HTTP, etc.).

The term "computer-readable medium" refers to any medium that participates in providing instructions to processor(s) 602 for execution, including without limitation, non-volatile media (e.g., optical or magnetic disks), volatile media (e.g., memory) and transmission media. Transmission media includes, without limitation, coaxial cables, copper wire and fiber optics.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

Architecture can serve Web pages for the EDR application. Storage device can provide secure data registers and other data registers described above.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

It should be appreciated that in the above description of exemplary embodiments of the present disclosure, various features of the present disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B, which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. An integrated data integrity management system configured to enable a user to selectively and intentionally cause generation of point-in-time digital evidence of physical situations, the system including:
    an application server, which communicates with a plurality of discrete networked mobile devices, wherein each mobile device executes an event data recordal software application (EDR application) which to exchanges data with the application server;
    a location register in a network accessible location, wherein the location register stores electronic records, which associate a plurality of location UIDs each with a respective geolocational token;
    a configuration interface provided via the application server, which enables the user, when operating a given executing instance of the EDR application on the device on which the EDR application is executing, to associate one or more location UIDs with a selected user UID;

a secure data set generation interface provided via the application server, which enables the user of the given executing instance of the EDR application to selectively and intentionally trigger defining of a secured data set, which provides point-in-time digital evidence of a physical situation based on data collected via biometric, positioning and imaging sensors of the mobile device, wherein triggering defining of the secured data set includes, within a predefined time period:
(i) operation of a biometric sensor provided via a device on which the EDR application is executing thereby to define point-in-time biometric data via the EDR application, wherein this point-in-time biometric data is processed thereby to verify the user based on a unique biometric token;
(ii) operation of a positioning hardware module provided via the device on which the EDR application is executing thereby to define point-in-time positional data;
(iii) operation of image capture hardware provided via the device on which the EDR application is executing either during the predefined time period or during a threshold window preceding the predefined time period; and
(iv) uploading, to the application server, one or more image files for images captured via the device on which the EDR application is executing;
wherein, in the case that predefined data integrity requirements are satisfied, the application server causes the secured data set to be stored in a network accessible database;
wherein the predefined data integrity requirements include: a requirement that the operation of the biometric sensor, operation of positioning hardware and operation of image capture hardware occur within a threshold temporal and/or locational proximity; and
wherein the secure data set generation interface enables the user to select between a plurality of predefined templates, wherein each template is associated with a series of predefined data and/or image collection prompts thereby to facilitate defining of a secured data set having a predefined data composition associated with the template, such that upon selection of a given one of the templates, triggering defining of the secured data set includes delivery of one or more of the predefined data and/or image collection prompts associated with that template thereby to instruct the user to capture photographs of specific real world artefacts.

2. The system of claim 1, wherein a data integrity module: executes a predefined algorithm thereby to define a data integrity token for the secured data set; and stores the data integrity token to a blockchain, wherein, in the event that the secured data set is modified, the predefined algorithm generates a distinct data integrity token, such that a blockchain provides an immutable record for verifying data integrity of the secured data set.

3. The system of claim 1, wherein one or more of the predefined templates are defined to facilitate for evidence collection for quality assurance.

4. The system of claim 1, wherein the secure data set generation is configured to automatically trigger defining of a secured data set based on a location-based trigger in the event that the device enters a defined geographic zone described by a location token for a location UID associated with the user UID.

5. The system of claim 1, wherein a plurality of the secured data sets are stored in a searchable repository, thereby to enable correlation of secured data sets based on either: user UID; or location UID.

6. An integrated data integrity management system configured to enable a user to selectively and intentionally cause generation of point-in-time digital evidence of physical situations, the system including:
an application server, which communicates with a plurality of discrete networked mobile devices, wherein each mobile device executes an event data recordal software application (EDR application) which to exchanges data with the application server;
a biometric register in a network accessible location, wherein the biometric register stores electronic records, which associate a plurality of user unique identifiers (UIDs) each with a respective unique associated biometric token;
a biometric record generation interface provided via the application server, which enables the user, when operating a given executing instance of the EDR application on the device on which the EDR application is executing, to trigger generation of a new record in the biometric register, wherein triggering generation of a new record in the biometric register includes uploading via the EDR application: (i) image data representative of a photo identity document; and (ii) current biometric data including facial image data, and wherein a process of generating a new record in the biometric register includes generating a new user UID and associating that new user UID with a biometric token derived from the current biometric data;
a location register in a network accessible location, wherein the location register stores electronic records, which associate a plurality of location UIDs each with a respective geolocational token;
a configuration interface provided via the application server, which enables the user of the given executing instance of the EDR application to associate one or more location UIDs with a selected user UID;
a secure data set generation interface provided via the application server, which enables the user of the given executing instance of the EDR application to selectively and intentionally trigger defining of a secured data set, which provides point-in-time digital evidence of a physical situation based on data collected via biometric, positioning and imaging sensors of the mobile device, wherein triggering defining of the secured data set includes, within a predefined time period:
(i) operation of a biometric sensor provided via a device on which the EDR application is executing thereby to define point-in-time biometric data via the EDR application, wherein this point-in-time biometric data is processed thereby to verify a UID based on its associated unique biometric token;
(ii) operation of a positioning hardware module provided via the device on which the EDR application is executing thereby to define point-in-time positional data;
(iii) operation of image capture hardware provided via the device on which the EDR application is executing either during the predefined time period or during a threshold window preceding the predefined time period; and
(iv) uploading, to the application server, one or more image files for images captured via the device on which the EDR application is executing;

wherein, in the case that predefined data integrity requirements are satisfied, the application server causes the secured data set to be stored in a network accessible database;

wherein the predefined data integrity requirements include: a requirement that the operation of the biometric sensor, operation of positioning hardware and operation of image capture hardware occur within a threshold temporal and/or locational proximity; and a data integrity module, which applies a data integrity preservation measure thereby to inhibit modification of the secured data set.

7. The system of claim 6, wherein the data integrity module: executes a predefined algorithm thereby to define a data integrity token for the secured data set; and stores the data integrity token to a blockchain, wherein, in the event that the secured data set is modified, the predefined algorithm generates a distinct data integrity token, such that a blockchain provides an immutable record for verifying data integrity of the secured data set.

8. The system of claim 6, wherein triggering defining of a secured data set additionally includes selecting a predefined template from a set of predefined templates, wherein selection of the predefined template triggers a series of data and/or image collection prompts thereby to facilitate defining of a secured data set having a predefined data composition associated with the template.

9. The system of claim 6, wherein the generating a new record in the biometric register additionally includes: (i) performing a first facial recognition process thereby to verify that the photo identity document includes a photo that matches the current biometric data including facial image data; and (ii) in the case that verification at (i) is successful, defining a facial biometric token based on the current biometric data including facial image data.

10. The system of claim 6, wherein a plurality of the secured data sets are stored in a searchable repository, thereby to enable correlation of secured data sets based on either: user UID; or location UID.

11. A data integrity management process performed in a computer network, the process including:

operating an application server, which is configured to communicate with a plurality of discrete networked mobile devices, wherein each mobile device executes an event data recordal software application (EDR application) configured to exchange data with the application server;

maintaining a biometric register in a network accessible location, wherein the biometric register is configured to store electronic records that associate a plurality of user unique identifiers (UIDs) each with a respective unique associated biometric token;

maintaining a location register in a network accessible location, wherein the location register is configured to store electronic records that associate a plurality of location UIDs each with a respective geolocational token;

providing an interface via the application server, which enables a user of a given executing instance of the EDR application to associate one or more location UIDs with a selected user UID;

providing an interface via the application server, which enables the user of the given executing instance of the EDR application, via the device on which the EDR application is executing, to trigger defining of a secured data set, wherein triggering defining of a secured data set includes, within a predefined time period:

(i) performing a biometric verification process based on point-in-time biometric data collection via the EDR application, thereby to verify a UID based on its associated unique biometric token;

(ii) determining current positional data for a device on which the EDR application is executing, and correlating that current positional data for a geolocational token for a location UID associated with the UID;

(iii) uploading one or more image files for images captured via the device on which the EDR application is executing either during the predefined time period or during a threshold window preceding the predefined time period;

in the case that predefined data integrity requirements are satisfied, storing the secured data set in a network accessible database; and applying a data integrity preservation measure thereby to inhibit modification of the secured data set.

\* \* \* \* \*